(12) United States Patent
Liu et al.

(10) Patent No.: US 12,026,105 B2
(45) Date of Patent: Jul. 2, 2024

(54) IMAGE RECOGNITION PROCESSING METHOD AND APPARATUS

(71) Applicant: CANAAN BRIGHT SIGHT CO., LTD, Beijing (CN)

(72) Inventors: Minli Liu, Beijing (CN); Nangeng Zhang, Beijing (CN)

(73) Assignee: CANAAN BRIGHT SIGHT CO., LTD, Beijing (CN)

(*) Notice: Subject to any disclaimer, the term of this patent is extended or adjusted under 35 U.S.C. 154(b) by 625 days.

(21) Appl. No.: 17/272,557

(22) PCT Filed: Jul. 10, 2019

(86) PCT No.: PCT/CN2019/095449
§ 371 (c)(1),
(2) Date: Mar. 1, 2021

(87) PCT Pub. No.: WO2020/042771
PCT Pub. Date: Mar. 5, 2020

(65) Prior Publication Data
US 2021/0326619 A1  Oct. 21, 2021

(30) Foreign Application Priority Data
Aug. 31, 2018  (CN) .......................... 201811010061.0

(51) Int. Cl.
*G06K 9/00*  (2022.01)
*G06F 13/16*  (2006.01)
(Continued)

(52) U.S. Cl.
CPC .......... *G06F 13/1668* (2013.01); *G06F 18/21* (2023.01); *G06N 3/04* (2013.01);
(Continued)

(58) Field of Classification Search
CPC .......... G06N 3/045; G06N 3/04; G06N 3/063; G06F 13/1668; G06F 18/21;
(Continued)

(56) References Cited

U.S. PATENT DOCUMENTS

2018/0259608 A1* 9/2018 Golden ............ G01R 33/56308
2019/0122074 A1* 4/2019 Zhang ..................... G06N 3/045
(Continued)

FOREIGN PATENT DOCUMENTS

CN  108416422  8/2018

OTHER PUBLICATIONS

International Search Report for PCT/CN2019/095449, dated Oct. 17, 2019.

*Primary Examiner* — Congvan Tran
(74) *Attorney, Agent, or Firm* — McDonnell Boehnen Hulbert & Berghoff LLP

(57) ABSTRACT

An image recognition processing method and apparatus. The method comprises: obtaining original image data, convolutional neural network configuration parameters, and convolutional neural network operation parameters, the original image data comprising data of M pixel points (101); performing convolutional neural network operation on the original image data by a convolutional neural network operation module (2) according to the convolutional neural network configuration parameters and the convolutional neural network operation parameters, wherein the convolutional neural network operation module (2) comprises N operation components (21) which are provided in parallel, each operation component (21) comprises a convolution operation unit (22), a batch processing operation unit (23), and an activation operation unit (24) which are sequentially connected, the N operation components (21) respectively simultaneously perform convolution operation, batch pro-
(Continued)

---

101  Obtaining original image data, convolutional neural network configuration parameters and convolutional neural network operation parameters, the original image data comprising Data for M pixels 102  Performing, by a convolutional neural network operation module, convolutional neural network operation on the original image data according to the convolutional neural network configuration parameters and the convolutional neural network operation parameters, where the convolutional neural network operation module comprises N operation components provided in parallel, each operation component including a convolution operation unit, a batch processing operation unit and an activation operation unit connected sequentially, and the N operation components performing a convolution operation, a batch processing operation and an activation operation on the data for N pixels in the original image data respectively and simultaneously, N being a positive integer less than or equal to M cessing operation, and activation operation on data of N pixel points in the original image data, and N is a positive integer smaller than or equal to M (102). The method improves the real-time performance of image recognition processing.

19 Claims, 4 Drawing Sheets

(51) Int. Cl.
*G06F 18/21* (2023.01)
*G06N 3/04* (2023.01)
*G06V 10/44* (2022.01)
*G06V 10/764* (2022.01)
*G06V 10/82* (2022.01)
*G06V 10/94* (2022.01)

(52) U.S. Cl.
CPC .......... *G06V 10/454* (2022.01); *G06V 10/764* (2022.01); *G06V 10/82* (2022.01); *G06V 10/955* (2022.01)

(58) Field of Classification Search
CPC .. G06V 10/764; G06V 10/955; G06V 10/454; G06V 10/82
See application file for complete search history.

(56) References Cited

U.S. PATENT DOCUMENTS

| | | | |
|---|---|---|---|
| 2019/0373264 A1* | 12/2019 | Chong | H04N 19/91 |
| 2020/0184647 A1* | 6/2020 | Harrison | G16H 30/40 |
| 2021/0090306 A1* | 3/2021 | Akcakaya | G01R 33/5611 |
| 2021/0150767 A1* | 5/2021 | Ikai | H04N 19/159 |

* cited by examiner

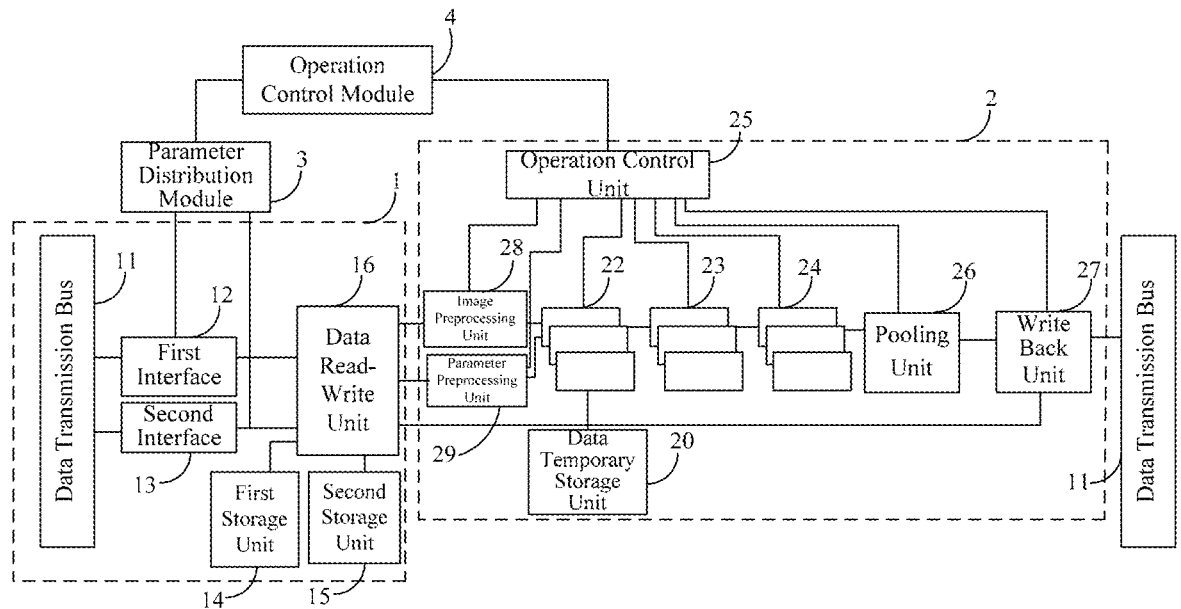
Fig.5
| | $D_0$ | $D_1$ | $D_2$ | $D_3$ | ... | $D_{63}$ | $D_{64}$ |
|---|---|---|---|---|---|---|---|
| $D_{63}$ | $D_{64}$ | $D_{65}$ | $D_{66}$ | $D_{67}$ | ... | $D_{127}$ | $D_{128}$ |
| $D_{127}$ | $D_{128}$ | $D_{129}$ | $D_{130}$ | $D_{131}$ | ... | $D_{191}$ | $D_{192}$ |
Fig.6
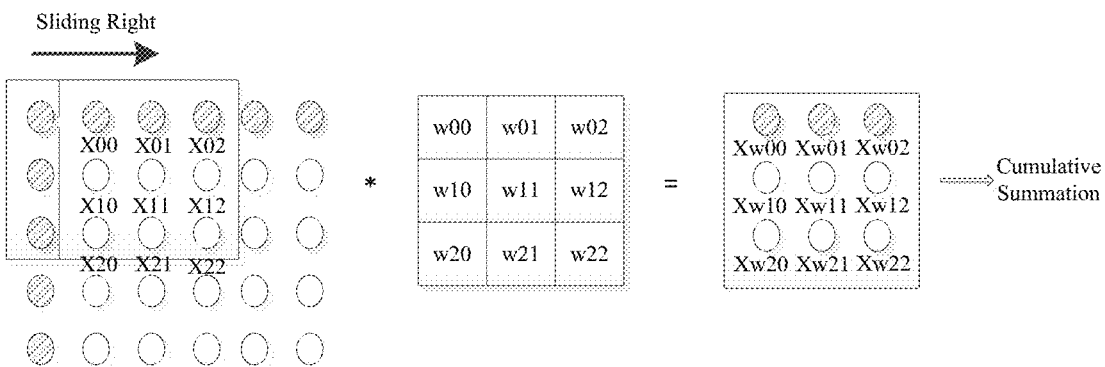
Fig.7

IMAGE RECOGNITION PROCESSING METHOD AND APPARATUS

TECHNICAL FIELD

The present disclosure relates to the field of data processing, and in particular, to an image recognition processing method and an image recognition processing apparatus.

BACKGROUND

Convolutional Neural Network (CNN) was first proposed by Yann Lecun and applied to handwritten digit recognition in which the CNN has maintained its dominance. In recent years, convolutional neural network has been continuously advancing in many fields and great breakthroughs have been achieved in speech recognition, face recognition, general object recognition, motion analysis, natural language processing and even brain wave analysis. CNN can be scaled up and configured to support the tagging of data sets on which learning processing has been performed. Under these conditions, it has been found that CNN is successful in learning complex and robust image features.

CNN is a kind of feedforward artificial neural network, in which individual neurons are collaged in such a way that they can respond to overlapping patches in the field of view. CNN is inspired by the behavior of the optic nerves in living creatures. CNN uses multi-layer neuron connections to process image data, thereby achieving high accuracy in image recognition.

A single processor is limited in computing power, so other computing configurations need to be explored to meet the needs of supporting CNN. In various fields of exploration, hardware-specific CNN accelerators are used to implement the form of general-purpose computing on graphic processing unit (GPU), multi-core processor, field programmable gate array (FPGA) and application-specific integrated circuit (ASIC). It should be noted that, because software can not meet the demands of image data processing speed, a CNN accelerator is realized by hardware in the field of image data processing.

In the prior art, when performing image recognition processing, CNN operation requires to perform multiple operations on the image data, and the operation processes are performed in a serial mode, which has the technical problems of low operation efficiency and poor real-time performance.

SUMMARY

To solve the problem of poor real-time performance of image recognition processing method in the prior art, the present disclosure provides an image recognition processing method and an image recognition processing apparatus to realize the parallel processing of convolutional neural network operations and improve the real-time performance of image recognition processing.

To attain the above object, the present disclosure puts forwards the technical solutions below.

In a first aspect, an embodiment of the present disclosure provides an image recognition processing method including:
  obtaining original image data, convolutional neural network configuration parameters and convolutional neural network operation parameters, where the original image data include data for M pixels, M being a positive integer; and
  performing, by a convolutional neural network operation module, convolutional neural network operation on the original image data according to the convolutional neural network configuration parameters and the convolutional neural network operation parameters, where the convolutional neural network operation module includes N operation components provided in parallel, each of the N operation components including a convolution operation unit, a batch processing operation unit and an activation operation unit connected sequentially, and the N operation components performing a convolution operation, a batch processing operation and an activation operation on data for N pixels in the original image data respectively and simultaneously, N being a positive integer less than or equal to M.

Optionally, the obtaining original image data, convolutional neural network configuration parameters and convolutional neural network operation parameters includes:
  obtaining the original image data, the convolutional neural network configuration parameters and the convolutional neural network operation parameters via a data transmission bus.

Optionally, the obtaining the original image data, the convolutional neural network configuration parameters and the convolutional neural network operation parameters via a data transmission bus includes:
  obtaining the original image data, the convolutional neural network configuration parameters and the convolutional neural network operation parameters via an advanced extensible interface (AXI) bus.

Optionally, the obtaining of the original image data includes obtaining the original image data via a first interface, and writing the original image data into a first storage unit;
  the obtaining of the convolutional neural network configuration parameters includes obtaining a parameter configuration instruction via a first interface, and sending the parameter configuration instruction to a parameter distribution module, where the parameter configuration instruction includes the convolutional neural network configuration parameters; and
  the obtaining of the convolutional neural network operation parameter includes obtaining convolution operation parameters, batch processing operation parameters and activation operation parameters via a second interface, writing the convolution operation parameters and the batch processing operation parameters into a second storage unit, and sending the activation operation parameters to the parameter distribution module.

Optionally, the method further includes:
  obtaining, by an operation control module, control-purpose configuration parameters among the convolutional neural network configuration parameters from the parameter distribution module;
  controlling, by the operation control module according to the control-purpose configuration parameters, the obtaining of the original image data from the first interface, the obtaining of the parameter configuration instruction from the first interface and the obtaining of the convolution operation parameters, the batch processing operation parameters and the activation operation parameters from the second interface; and
  sending, by the operation control module, the control-purpose configuration parameters among the convolutional neural network configuration parameters to the convolutional neural network operation module.

Optionally, the convolutional neural network operation module further includes an operation control unit, and the method further includes:

receiving, by the operation control unit, the control-purpose configuration parameters among the convolutional neural network configuration parameters, where the control-purpose configuration parameters include an original image size for input or output, and the number of input or output channels of each layer of convolutional neural network; and controlling, according to the control-purpose configuration parameters, reading of the original image data from the first storage unit, reading of the convolution operation parameters and the batch processing operation parameters from the second storage unit and sending of the original image data, the convolution operation parameters and the batch processing operation parameters to the convolution operation unit.

Optionally, the method further includes:

obtaining, from the parameter distribution module by the operation control module, the activation operation parameters, and operation-purpose configuration parameters among the convolutional neural network configuration parameters, wherein the operation-purpose configuration parameters comprises convolution operation configuration parameters, a convolution kernel size and a pooling mode; sending, by the operation control module, the activation operation parameters and the operation-purpose configuration parameters to the operation control unit of the convolutional neural network operation module; and sending, by the operation control unit, the activation operation parameters to the activation operation unit, sending the convolution operation configuration parameters and the convolution kernel size to the convolution operation unit, and sending the pooling mode to a pooling unit; or sending, by the parameter distribution module, the activation operation parameters directly to the activation operation unit, sending the convolution operation configuration parameters and the convolution kernel size to the convolution operation unit, and sending the pooling mode to a pooling unit.

Optionally, the method further includes:

performing image padding processing on the original image data read from the first storage unit and sending the processed original image data to the convolution operation unit; and performing cumulative summation processing on the convolution operation parameters read from the second storage unit and sending the processed convolution operation parameters to the convolution operation unit.

Optionally, the second storage unit includes a first storage, a second storage and a third storage, and the writing of the convolution operation parameters and the batch processing operation parameters into the second storage unit and the reading of the convolution operation parameters and the batch processing operation parameters from the second storage unit includes:

writing the convolution operation parameters into the first storage or the second storage, and reading the convolution operation parameters from the first storage or the second storage, where the convolution operation parameters are read from the second storage when writing the convolution operation parameters into the first storage, or the convolution operation parameters are read from the first storage when writing the convolution operation parameters into the second storage; and writing the batch processing operation parameters into the third storage, and reading the batch processing operation parameters from the third storage.

In a second aspect, an embodiment of the present disclosure further provides an image recognition processing apparatus including:

a parameter obtaining module configured to obtain original image data, convolutional neural network configuration parameters and convolutional neural network operation parameters, where the original image data includes data for M pixels, M being a positive integer; and a convolutional neural network operation module connected to the parameter obtaining module and configured to perform convolutional neural network operation on the original image data according to the convolutional neural network configuration parameters and the convolutional neural network operation parameters, where the convolutional neural network operation module includes N operation components provided in parallel, each of the N operation components including a convolution operation unit, a batch processing operation unit and an activation operation unit connected sequentially, and the N operation components performing a convolution operation, a batch processing operation and an activation operation on data for N pixels in the original image data respectively and simultaneously, N being a positive integer less than or equal to M.

Optionally, the image recognition processing apparatus further includes a parameter distribution module including a data transmission bus, a first interface, a second interface, a first storage unit and a second storage unit, where:

the data transmission bus is configured to transmit the original image data, the convolutional neural network configuration parameters and the convolutional neural network operation parameters;

the first interface includes a first end connected to the data transmission bus, and a second end connected to the parameter distribution module and the first storage unit, and is configured to obtain the original image data from the data transmission bus and write the original image data into the first storage unit, and obtain the parameter configuration instruction from the data transmission bus and send the parameter configuration instruction to the parameter distribution module, where the parameter configuration instruction includes the convolutional neural network configuration parameters;

the second interface includes a first end connected to the data transmission bus, and a second end connected to the parameter distribution module and the second storage unit, and is configured to obtain the convolution operation parameters, the batch processing operation parameters and the activation operation parameters from the data transmission bus, write the convolution operation parameters and the batch processing operation parameters into the second storage unit, and send the activation operation parameters to the parameter distribution module.

Optionally, the image recognition processing apparatus further includes an operation control module connected to the parameter distribution module and the convolutional neural network operation module, where the operation control module is configured to: obtain the control-purpose configuration parameters among the convolutional neural network configuration parameters from the parameter distribution module; control according to the control-purpose configuration parameters the obtaining of the original image data from the first interface, the obtaining of the parameter configuration instruction from the first interface and the obtaining of the convolution operation parameters, the batch processing operation parameters and the activation operation parameters from the second interface; and send the control-purpose configuration parameters among the convolutional neural network configuration parameters to the convolutional neural network operation module.

Optionally, the convolutional neural network operation module further includes an operation control unit including a parameter input terminal connected to the operation control module, and a control terminal connected to the convolution operation unit, the batch processing operation unit and the activation operation unit, where the operation control unit is configured to: receive the control-purpose configuration parameters among the convolutional neural network configuration parameters, the control-purpose configuration parameters including an original image size for input or output, and the number of input or output channels of each layer of convolutional neural network; and control, according to the control-purpose configuration parameters, reading of the original image data from the first storage unit, reading of the convolution operation parameters and the batch processing operation parameters from the second storage unit and sending of the original image data, the convolution operation parameters and the batch processing operation parameters to the convolution operation unit.

Optionally, the convolutional neural network operation module further includes a pooling unit and a write back unit, where:

each of the pooling unit and the write back unit is connected to the control terminal of the operation control unit; the operation control module is further configured to: obtain from the parameter distribution module the activation operation parameters, and operation-purpose configuration parameters among the convolutional neural network configuration parameters, the operation-purpose configuration parameters including convolution operation configuration parameters, a convolution kernel size and a pooling mode, and send the activation operation parameters, and the operation-purpose configuration parameters among the convolutional neural network configuration parameters to the operation control unit of the convolutional neural network operation module; and the operation control unit is further configured to send the activation operation parameters to the activation operation unit, send the convolution operation configuration parameters and the convolution kernel size to the convolution operation unit, and send the pooling mode to the pooling unit; or the parameter distribution module is directly connected to the activation operation unit, the convolution operation unit and the pooling unit, and the parameter distribution module is configured to directly send the activation operation parameters to the activation operation unit, send the convolution operation configuration parameters and the convolution kernel size to the convolution operation unit, and send the pooling mode to the pooling unit.

Optionally, the convolutional neural network operation module further includes:

an image preprocessing unit provided between the first storage unit and the convolution operation unit and configured to perform image padding processing on the original image data and send the processed original image data to the convolution operation unit; and a parameter preprocessing unit provided between the second storage unit and the convolution operation unit and configured to perform cumulative summation processing on the convolution operation parameters and send the processed convolution operation parameters to the convolution operation unit.

Optionally, the parameter obtaining module further includes a data read-write unit connected to the first interface, the first storage unit, the second interface, the second storage unit, the image preprocessing unit, the parameter preprocessing unit, and the write back unit, where:

the data read-write unit is configured to obtain the original image data from the first interface and write the original image data into the first storage unit, and read the original image data from the first storage unit and send the original image data to the image preprocessing unit;

the data read-write unit is further configured to obtain the convolution operation parameters and the batch processing operation parameters from the second interface and write the convolution operation parameters and the batch processing operation parameters into the second storage unit, and read the convolution operation parameters and the batch processing operation parameters from the second storage unit and send the convolution operation parameters and the batch processing operation parameters to the parameter preprocessing unit; and the data read-write unit is further configured to write into the first storage unit the image data subjected to a pooling operation and sent by the write back unit.

Optionally, the second storage unit includes a first storage, a second storage and a third storage, and the data read-write unit is specifically configured to: write the convolution operation parameters into the first storage or the second storage, read the convolution operation parameters from the first storage or the second storage, where the convolution operation parameters are read from the second storage when writing the convolution operation parameters into the first storage, or, the convolution operation parameters are read from the first storage when writing the convolution operation parameters into the second storage; and write the batch processing operation parameters into the third storage, and read the batch processing operation parameters from the third storage.

Optionally, the image recognition processing apparatus further includes a data temporary storage unit connected to the convolution operation unit of each of the N operation components and configured to store a result of convolution operation performed for each input channel by the convolution operation unit.

Optionally, the data transmission bus is an advanced extensible interface (AXI) bus.

In the technical solutions provided in the embodiments of the present disclosure, during the image recognition processing, when CNN operation is performed, the convolutional neural network operation module includes N operation components provided in parallel, each of the N operation components including a convolution operation unit, a batch processing operation unit and an activation operation unit connected sequentially, and the N operation components performing a convolution operation, a batch processing operation and an activation operation on data for N pixels in the original image data respectively and simultaneously, N being a positive integer less than or equal to M, thus the operation components can perform the above operations on data for N pixels simultaneously, thereby attaining the technical effect of performing a parallel operation on the original image data, and compared to sequentially performing CNN operations on data for respective pixels in a serial mode in the prior art, improving the operation efficiency and improving the real-time performance of image recognition processing.

It should be understood that, the general description above and the detailed description below are merely exemplary and illustrative, without limiting the present disclosure.

BRIEF DESCRIPTION OF THE DRAWINGS

Other features, objects and advantages of the present disclosure will be made more apparent by detailed description of the following nonrestrictive embodiments in conjunction with the drawings. In the drawings:

FIG. 5 is a structural representation of yet another image recognition processing apparatus according to an embodiment of the present disclosure;

FIG. 6 is a storage diagram of a storage employed in a first storage unit according to an embodiment of the present disclosure;

FIG. 7 is a schematic diagram of a convolution operation according to an embodiment of the present disclosure.

DETAILED DESCRIPTION OF THE EMBODIMENTS

Figure 1:
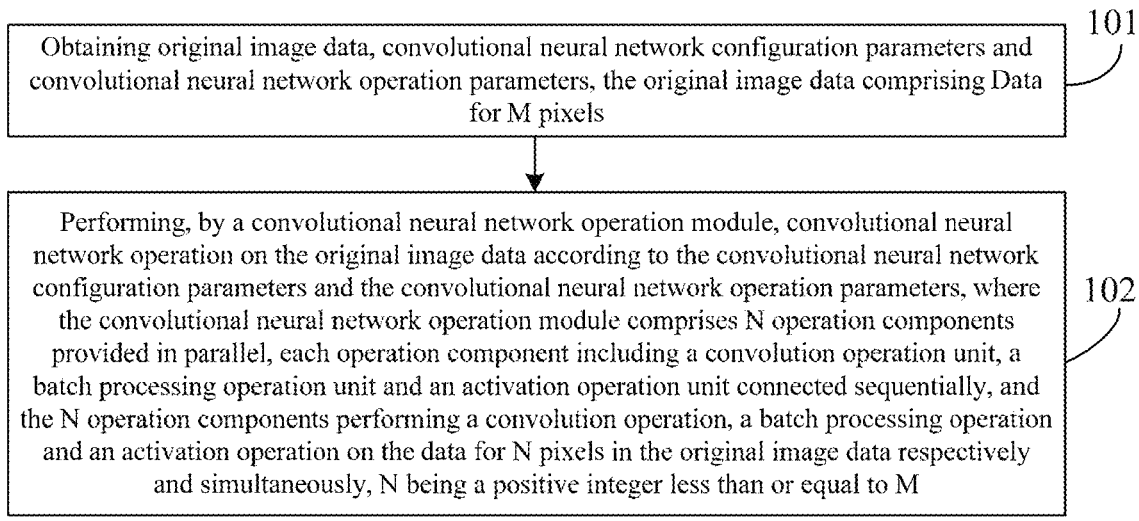
FIG. 1 is a schematic flow chart of an image recognition processing method according to an embodiment of the present disclosure.

Exemplary embodiments of the present disclosure will be described in detail below by referring to the drawings for being easily implemented by one skilled in the art. In addition, for the sake of clarity, parts unrelated to the exemplary embodiments described will be omitted in the drawings.

In the present disclosure, it should be understood that, terms such as "include" or "comprise", etc., indicate the existence of the characteristics, figures, steps, actions, components and parts disclosed in the present disclosure or combinations thereof, without excluding the existence of one or more other characteristics, figures, steps, actions, components, parts or combinations thereof.

In addition, it should be noted that, in the case of no conflict, the embodiments of the present disclosure and the features in the embodiments may be combined with each other. The present disclosure will be illustrated in detail below by referring to the drawings and in conjunction with the embodiments.

As described in the background of the present disclosure, in the prior art, during image recognition processing, the convolutional neural network operation module needs to perform multiple operations on the original image data, and the operation processes are performed respectively on pixels in a serial mode, which has the technical problems of low operation efficiency and poor real-time performance.

In view of the above technical problems of the prior art during convolutional neural network operation in an image recognition process, the present disclosure provides an image recognition processing method. FIG. 1 is a schematic flow chart of an image recognition processing method according to an embodiment of the present disclosure, as shown in FIG. 1, the method includes the steps of:

Step 101: original image data, convolutional neural network configuration parameters and convolutional neural network operation parameters are obtained, where the above original image data includes data for M pixels, M being a positive integer;

Specifically, in this step, when a convolutional neural network is utilized for image recognition so as to recognize feature information such as a human, an animal or a vehicle, etc., it first needs to obtain the original image data and then obtain the convolutional neural network configuration parameters and the convolutional neural network operation parameters. Convolutional neural network operation may include multi-layer operation, while the above configuration parameters and operation parameters are flow control parameters or operation parameters required for each layer of convolutional neural network operation, for example, operation parameters used for performing convolution operation, batch processing operation and activation operation. Specifically, in this step, a specialized parameter obtaining module may be provided for obtaining the above original image data, convolutional neural network configuration parameters and convolutional neural network operation parameters.

Step 102: a convolutional neural network operation module performs convolutional neural network operation on the original image data according to the above convolutional neural network configuration parameters and convolutional neural network operation parameters, where the convolutional neural network operation module includes N operation components provided in parallel, each of the N operation components including a convolution operation unit, a batch processing operation unit and an activation operation unit connected sequentially, and the N operation components performing a convolution operation, a batch processing operation and an activation operations on data for N pixels in the original image data respectively and simultaneously, N being a positive integer less than or equal to M.

Figure 2:
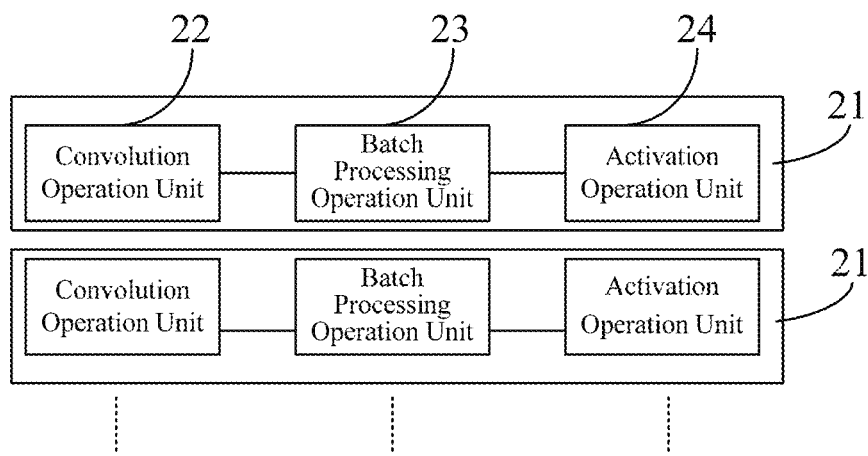
FIG. 2 is a structural representation of a convolutional neural network operation module according to an embodiment of the present disclosure.

Specifically, on the basis that the original image data, the convolutional neural network configuration parameters and the convolutional neural network operation parameters are obtained in the above Step 101, the original image data are input into the convolutional neural network operation module for operation. Referring to FIG. 2, FIG. 2 is a structural representation of a convolutional neural network operation module according to an embodiment of the present disclosure. As shown in FIG. 2, the module includes N operation components 21 provided in parallel, and each operation component includes a convolution operation unit 22, a batch processing operation unit 23 and an activation operation unit 24 connected sequentially. During operation, data for each pixel is input into one operation component, thus N operation components may process data for N pixels simultaneously, so that a convolution operation, a batch processing operation and an activation operation can be performed on data for pixels in the respective operation components simultaneously, thus an effect of parallel operation can be realized, thereby improving the operation efficiency of convolutional neural network operation and improving the real-time performance of the image recognition process.

In the embodiment shown in FIG. 1, the obtaining original image data, convolutional neural network configuration parameters and convolutional neural network operation parameters in Step 101 may specifically include: original image data, convolutional neural network configuration parameters and convolutional neural network operation parameters are obtained via a data transmission bus, that is, in addition to obtaining the original image data, the convolutional neural network configuration parameters and the convolutional neural network operation parameters may be further obtained from the data transmission bus in real time, and the configuration parameters and operation parameters obtained in this way may be adjusted in real time according to practical operation requirements, thereby realizing the programmability and configurability of convolutional neural network operation and supporting convolutional neural network architectures of different scales at the same time.

Further, the above data transmission bus may be an advanced extensible interface (AXI) bus, that is, the above original image data, convolutional neural network configuration parameters and convolutional neural network operation parameters may be obtained via an AXI bus. Specifically, the AXI bus may be a data transmission bus conforming to the ARM architecture. The technical solution provided in this embodiment can be compatible with the existing ARM architecture. The AXI bus is also an on-chip bus directed to high performance, high bandwidth and low delay, which can meet the design requirement of an ultrahigh-performance and complex on-chip system and meet the requirement of utilizing a hardware system to realize real-time operation of the convolutional neural network in the embodiments of the present disclosure When the above data transmission bus (for example, an AXI bus) is utilized to transmit the original image data and the convolutional neural network operation parameters, a specialized interface may be provided to coordinate with the above data transmission bus for obtaining the original image data, convolutional neural network configuration parameters and convolutional neural network operation parameters from the data transmission bus. Moreover, a corresponding storage unit may be provided respectively for the original image data and the convolutional neural network operation parameters.

Specifically, two interfaces, i.e., a first interface and a second interface, may be provided, where the original image data are obtained via the first interface and the original image data are written into a first storage unit, a parameter configuration instruction is obtained via the first interface and the parameter configuration instruction is sent to a parameter distribution module, where the parameter configuration instruction includes the convolutional neural network configuration parameters. Specifically, a plurality of (for example, 12) parameter configuration instructions may be adapted for each layer of convolutional neural network, and the first interface at most supports receiving the parameter configuration instructions of several layers (for example, 13 layers) of networks at a time. After the parameter configuration instruction of one layer of convolutional neural network is used, the parameter configuration instruction of a new layer of network may be received. The above convolutional neural network configuration parameters may include, but are not limited to, an original image size for input or output, the number of input or output channels of each layer of convolutional neural network, a convolution kernel size and a pooling mode, etc., and may further include a multiplication coefficient, a shift coefficient and an additive coefficient, which are used in the convolution operation process and are relatively fixed for each layer of convolutional neural network operation, that is, the convolution operation configuration parameters. Each parameter configuration instruction may have a fixed length of 64 bit, and a different bit represents a different meaning. The parameter distribution module may parse each parameter configuration instruction to obtain the configuration parameters contained therein and distribute the configuration parameters to other modules for using. In addition, convolution operation parameters, batch processing operation parameters and activation operation parameters may be further obtained via a second interface, and the convolution operation parameters and the batch processing operation parameters are written into a second storage unit, and the activation operation parameters is sent to the parameter distribution module.

In the above step, by storing the original image data into the first storage unit and storing the convolutional neural network operation parameters into the second storage unit, respective storage of the above two types of data may be realized, and when the convolutional neural network operation module carries out an operation step, it may read the original image data from the first storage unit and read the convolutional neural network operation parameters from the second storage unit respectively, and send the above two types of data to the convolutional neural network operation module for performing an operation step.

Further, the image recognition processing apparatus may further include an operation control module, and the above method may further include:

the operation control module obtains control-purpose configuration parameters among the convolutional neural network configuration parameters from the parameter distribution module, and the operation control module may further control the whole flow of the image recognition processing method involved in the whole embodiments of the present disclosure. For example, the operation control module may control the obtaining of the original image data from the first interface, the obtaining of the parameter configuration instruction from the first interface and the obtaining of the convolution operation parameters, the batch processing operation parameters and the activation operation parameters from the second interface. In addition, the operation control module sends the control-purpose configuration parameters among the convolutional neural network configuration parameters to the convolutional neural network operation module, thus it may control the time to start the convolutional neural network operation.

Further, the convolutional neural network operation module may further include an operation control unit, and the method according to the embodiment of the present disclosure may further includes: the operation control unit receives the control-purpose configuration parameters in the convolutional neural network operation configuration parameters, and controls the convolutional neural network operation flow based on the control-purpose configuration parameters in the convolutional neural network operation configuration parameters, where the above control-purpose configuration parameters include, but are not limited to, an original image size for input or output, and the number of input or output channels of each layer of convolutional neural network. Specifically, the method includes: the operation control unit controls, according to the control-purpose configuration parameters, reading of the original image data from the first storage unit, reading of the convolution operation parameters and the batch processing operation parameters from the second storage unit, and sending of the original image data, the convolution operation parameters and the batch processing operation parameters to the convolution operation unit. In the embodiments of the present disclosure, the convolution operation unit and the batch processing operation unit in each operation component may be incorporated into one unit.

Additionally, the operation-purpose configuration parameters and the activation operation parameters among the convolutional neural network configuration parameters may be sent to each operation unit in two modes: in the first mode, the parameters are forwarded by operation control module and the operation control unit in the convolutional neural network operation module; and in the second mode, the parameters are directly distributed by the parameter distribution module. Specifically, the first mode further includes:

The operation control module obtains from the parameter distribution module the activation operation parameters, and operation-purpose configuration parameters among the convolutional neural network configuration parameters, where the operation-purpose configuration parameters include convolution operation configuration parameters, a convolution kernel size and a pooling mode;

The operation control module sends the activation operation parameters and the operation-purpose configuration parameters among the convolutional neural network configuration parameters to the operation control unit in the convolutional neural network operation module; and The operation control unit sends the activation operation parameters to the activation operation unit, and sends the convolution operation configuration parameters and the convolution kernel size to the convolution operation unit, and sends the pooling mode to the pooling unit.

The second mode further includes: the parameter distribution module directly sends the convolution operation configuration parameters and the convolution kernel size to the convolution operation unit, and sends the activation operation parameters to the activation operation unit, and sends the pooling mode to the pooling unit.

After the activation operation parameters and the operation-purpose configuration parameters among the convolutional neural network configuration parameters are distributed in the above two modes, the convolution operation unit may perform an convolution operation according to the convolution operation configuration parameters and the convolution kernel size, the activation operation unit may perform an activation operation according to the activation operation parameters, and the pooling unit may perform a pooling operation according to the pooling mode, that is, the convolutional neural network operation may further include a pooling operation step and a write back step, that is, the above method may further include: the pooling unit carries out, according to the pooling mode, a pooling operation on the image data on which an activation operation is performed, and writes back the image data subjected to the pooling operation into the first storage unit. Specifically, after each layer of convolutional neural network accomplishes the operation, the image data of this layer on which the operation is performed may be written back into the first storage unit for the next layer of convolutional neural network operation, and during the next layer of convolutional neural network operation, the above N operation components may further be utilized for parallel processing so as to improve the operation efficiency of the convolutional neural network.

Further, the convolutional neural network operation may further include a preprocessing step including performing image padding processing on the original image data, that is, the original image data read from the first storage unit is subjected to image padding processing before being sent to the convolution operation unit. In this step, the image padding processing may be padding the upper, lower, left and right boundaries of the image to meet the image data requirements of the convolution kernel size in the convolution operation process; and performing cumulative summation processing on the convolution operation parameters read from the second storage unit and sending the processed convolution operation parameters to the convolution operation unit. Specifically, the convolution operation parameters originally obtained may be further sent to the convolution operation unit.

In the above embodiment of the present disclosure, the convolution operation parameters and the batch processing operation parameters are stored into the second storage unit, and the second storage unit may include a first storage, a second storage and a third storage, then the writing the convolution operation parameters and the batch processing operation parameters into the second storage unit and reading the convolution operation parameters and the batch processing operation parameters from the second storage unit in the above method may specifically include:

the convolution operation parameters is written into the first storage or the second storage, and the convolution operation parameters is read from the first storage or the second storage, and when the convolution operation parameters is written into the first storage, the convolution operation parameters is read from the second storage, or, when the convolution operation parameters is written into the second storage, the convolution operation parameters is read from the first storage. That is, the convolutional neural network operation parameters are alternately written into the first storage and the second storage in a ping-pong operation mode, and the convolutional neural network operation parameters are alternately read from the first storage and the second storage, thus the parameter read-write efficiency may be improved, and the real-time performance of the whole image recognition processing may be improved. However, for the batch processing operation parameters, the batch processing operation parameters may be written into the third storage and read from the third storage.

Figure 3:
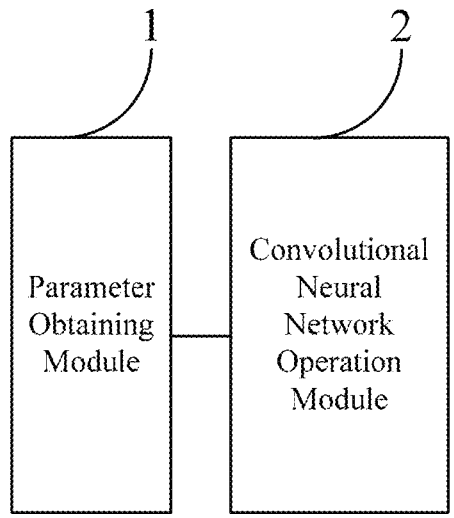
FIG. 3 is a structural representation of an image recognition processing apparatus according to an embodiment of the present disclosure.

Corresponding to the above method embodiment, an embodiment of the present disclosure further provides an image recognition processing apparatus, which can execute the above image recognition processing method and can attain the same technical effect. FIG. 3 is a structural representation of an image recognition processing apparatus according to an embodiment of the present disclosure. As shown in FIG. 3, the image recognition processing apparatus includes a parameter obtaining module 1 and a convolutional neural network operation module 2. Specifically, the above parameter obtaining module 1 is configured to obtain original image data, convolutional neural network configuration parameters and convolutional neural network operation parameters, where the original image data include data for M pixels, M being a positive integer; the convolutional neural network operation module 2 is connected to the parameter obtaining module 1 and configured to perform convolutional neural network operation on the original image data according to the convolutional neural network configuration parameters and the convolutional neural network operation parameters; where, referring to the above FIG. 2, the convolutional neural network operation module 2 includes N operation components 21 provided in parallel, each of the N operation components 21 includes a convolution operation unit 22, a batch processing operation unit 23 and an activation operation unit 24 connected sequentially, where the N operation components 21 are configured to perform a convolution operation, a batch processing operation and an activation operation on data for N pixels in the original image data respectively and simultaneously, N being a positive integer less than or equal to M.

In the image recognition processing apparatus provided in this embodiment, the convolutional neural network operation module includes N operation components provided in parallel, and during operation, data for each pixel is input into one operation component, thus N operation components may process data for N pixels simultaneously, so that a convolution operation, a batch processing operation and an activation operation can be performed on data for N pixels in the respective operation components simultaneously, thus an effect of parallel operation can be realized, thereby improving the operation efficiency of convolutional neural network operation and improving the real-time performance of image recognition processing.

Figure 4:
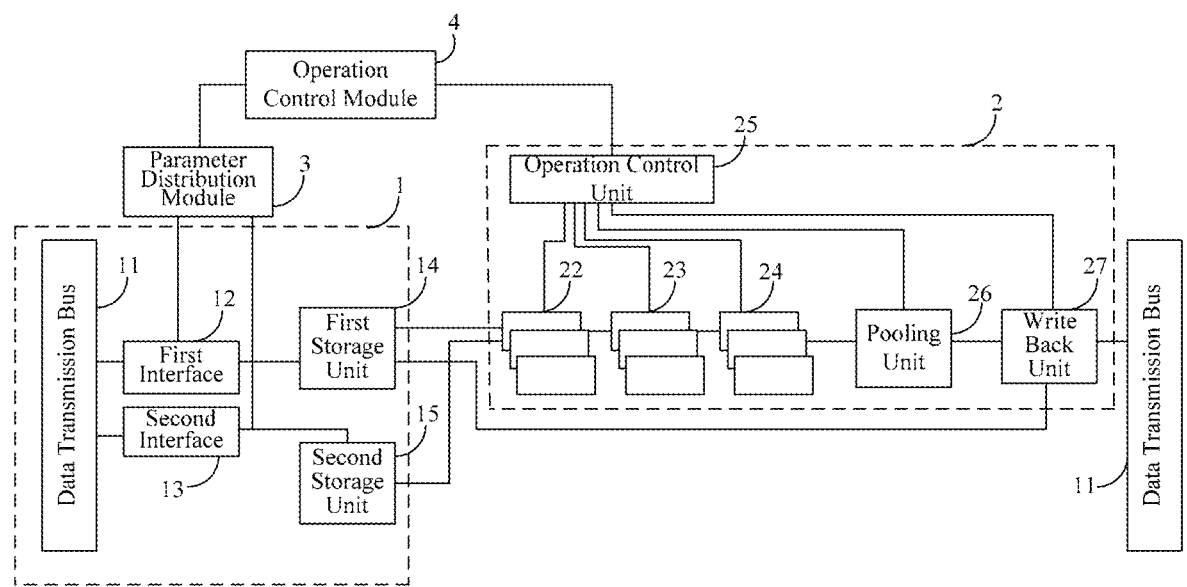
FIG. 4 is a structural representation of another image recognition processing apparatus according to an embodiment of the present disclosure.

FIG. 4 is a structural representation of another image recognition processing apparatus according to an embodiment of the present disclosure. As shown in FIG. 4, based on the embodiment shown in FIG. 3, the apparatus further includes a parameter distribution module 3, and the parameter obtaining module 1 includes a data transmission bus 11, a first interface 12, a second interface 13, a first storage unit 14 and a second storage unit 15. The data transmission bus 11 is configured to transmit the original image data, the convolutional neural network configuration parameters and the convolutional neural network operation parameters; the first end of the first interface 12 is connected to the data transmission bus 11, the second end of the first interface 12 is respectively connected to the parameter distribution module 3 and the first storage unit 14, the first interface 12 is configured to obtain the original data from the data transmission bus 11 and write the original data into the first storage unit 14, and obtain the parameter configuration instruction from the data transmission bus 11 and send the parameter configuration instruction to the parameter distribution module 3, where the parameter configuration instruction includes the convolutional neural network configuration parameters; the first end of the second interface 13 is connected to the data transmission bus 11, the second end of the second interface 13 is respectively connected to the parameter distribution module 3 and the second storage unit 15, and the second interface 13 is configured to obtain the convolution operation parameters, the batch processing operation parameters and the activation operation parameters from the data transmission bus 11, and write the convolution operation parameters and the batch processing operation parameters into the second storage unit 15, and send the activation operation parameters to the parameter distribution module 3. In the embodiments of the present disclosure, the first storage unit 14 and the second storage unit 15 may both employ a random access memory.

In this embodiment, a data transmission bus is provided and used for transmitting the original image data, the convolutional neural network configuration parameters and the convolutional neural network operation parameters, so that the convolutional neural network configuration parameters and the convolutional neural network operation parameters can be obtain in real time from the data transmission bus during each layer of convolutional neural network operation process, and the configuration parameters and operation parameters obtained in this way may be adjusted in real time according to practical requirements, thereby realizing the programmability and configurability of convolutional neural network operation. Further, the above data transmission bus may be an advanced extensible interface (AXI) bus. Specifically, the AXI bus may be a data transmission bus conforming to the ARM architecture, and the technical solution provided in this embodiment can be compatible with the existing ARM architecture. The AXI bus is also an on-chip bus directed to high performance, high bandwidth and low delay, which can meet the design requirement of an ultra-high-performance and complex on-chip system and meet the requirement of utilizing a hardware system to realize real-time operation of the convolutional neural network in the embodiments of the present disclosure.

In the embodiment of the present disclosure, still as shown in the above FIG. 4, the apparatus may further include an operation control module 4, which is respectively connected to the parameter distribution module 3 and the convolutional neural network operation module 2;

The operation control module 4 is configured to obtain the control-purpose configuration parameters among the convolutional neural network configuration parameters from the parameter distribution module 3, and may control the whole flow of the image recognition processing involved in the embodiment of the present disclosure. Specifically, the operation control module 4 is configured to: control the obtaining of the original image data from the first interface, the obtaining of the parameter configuration instruction from the first interface and the obtaining of the convolution operation parameters, the batch processing operation parameters and the activation operation parameters from the second interface; and send the control-purpose configuration parameters among the convolutional neural network configuration parameters to the convolutional neural network operation module 2. In addition, the operation control module 4 sends the control-purpose configuration parameters among the convolutional neural network configuration parameters to the convolutional neural network operation module 2, and may control the convolutional neural network operation flow, that is, control the time to start the convolutional neural network operation.

Further, still as shown in the above FIG. 4, the convolutional neural network operation module 2 further includes an operation control unit 25. The parameter input terminal of the operation control unit 25 is connected to the operation control module 4, and the control terminal of the operation control unit 25 is connected to the convolution operation unit 22, the batch processing operation unit 23 and the activation operation unit 24; where the operation control unit 25 is configured to: receive the control-purpose configuration parameters among the convolutional neural network configuration parameters, the control-purpose configuration parameters including an original image size for input or output, and the number of input or output channels of each layer of convolutional neural network; and control, according to the control-purpose configuration parameters among the convolutional neural network configuration parameters, reading of the original image data from the first storage unit 14 and send the original image data to the convolution operation unit 22, reading of the convolution operation parameters and the batch processing operation parameters from the second storage unit 15 and sending of the above convolution operation parameters and batch processing operation parameters to the convolution operation unit 22. In the embodiments of the present disclosure, the convolution operation unit 22 and the batch processing operation unit 23 in each operation component may be incorporated into one unit, which may be referred to as a convolution and batch processing operation unit and configured for performing the functions of convolution operation and batch processing operation.

Further, the convolutional neural network operation module 2 further includes a pooling unit 26 and a write back unit 27, which are respectively connected to the control terminal of the operation control unit 25.

Specifically, the activation operation parameters, and operation-purpose configuration parameters among the convolutional neural network configuration parameters may be distributed to each operation unit in tow modes.

In the first mode, the parameters are distributed sequentially by the operation control module 4 and the operation control unit 25 of the convolutional neural network operation module 2, that is, the operation control module 4 is further configured to: obtain from the parameter distribution module 3 the activation operation parameters, and operation-purpose configuration parameters among the convolutional neural network configuration parameters, where the operation-purpose configuration parameters include convolution operation configuration parameters, a convolution kernel size and a pooling mode; and send the activation operation parameters and the operation-purpose configuration parameters among the convolutional neural network configuration parameters to the operation control unit 25 of the convolutional neural network operation module 2. The operation control unit 25 is further configured to send the activation operation parameters to the activation operation unit 24, send the convolution operation configuration parameters and the convolution kernel size to the convolution operation unit 22 and send the pooling mode to the pooling unit 26.

In the second mode, the parameters are directly distributed by the parameter distribution module, that is, the parameter distribution module 3 may further be directly connected to the activation operation unit 24, the convolution operation unit 22 and the pooling unit 26, and the parameter distribution module 3 is configured to directly send the activation operation parameters to the activation operation unit 24, send the convolution operation configuration parameters and the convolution kernel size to the convolution operation unit 22, and send the pooling mode to the pooling unit 26.

After the activation operation parameters and the operation-purpose configuration parameters among the convolutional neural network configuration parameters are distributed in the above two modes, the convolution operation unit 22 may perform a convolution operation according to the convolution operation configuration parameters and the convolution kernel size, the activation operation unit 24 may perform an activation operation according to the activation operation parameters, and the pooling unit 26 may perform a pooling operation according to the pooling mode.

Specifically, the pooling unit 26 is configured to perform, according to the pooling mode from the convolutional neural network configuration parameters, a pooling operation on the image data on which an activation operation is performed, and control the write back unit 27 to write back the image data subjected to the pooling operation into the first storage unit 14. Specifically, after each layer of convolutional neural network accomplishes the operation, the image data of this layer on which the operation is performed may be written back into the first storage unit for the next layer of convolutional neural network operation, and during the next layer of convolutional neural network operation, the above N operation components may also be utilized for parallel operation.

FIG. 5 is a structural representation of yet another image recognition processing apparatus according to an embodiment of the present disclosure. As shown in FIG. 5, the convolutional neural network operation module 2 of the apparatus further includes an image preprocessing unit 28 and a parameter preprocessing unit 29, where the image preprocessing unit 28 is provided between the first storage unit 14 and the convolution operation unit 22 and configured to perform image padding processing on the original image data and send the processed original image data to the convolution operation unit 22, where the image padding processing may be padding the upper, lower, left and right boundaries of the image to meet the image data requirements of the convolution kernel size in the convolution operation process; and the parameter preprocessing unit 29 is provided between the second storage unit 15 and the convolution operation unit 22, and configured to perform cumulative summation processing on the convolution operation parameters and send the processed convolution operation parameters to the convolution operation unit 22. Specifically, the convolution operation parameters originally obtained may be further sent to the convolution operation unit.

Optionally, still as shown in the above FIG. 5, the parameter obtaining module 1 may further include a data read-write unit 16. The data read-write unit 16 is respectively connected to the first interface 12 and the first storage unit 14, respectively connected to the second interface 13 and the second storage unit 15, and respectively connected to the image preprocessing unit 28 and the parameter preprocessing unit 29, and connected to the write back unit 27, and the data read-write unit 16 is configured to obtain the original image data from the first interface 12 and write the original image data into the first storage unit 14, and read the original image data from the first storage unit 14 and send the original image data to the image preprocessing unit 28; the data read-write unit 16 is further configured to obtain the convolution operation parameters and the batch processing operation parameters from the second interface 13 and write the parameters into the second storage unit 15, and read the convolution operation parameters and the batch processing operation parameters from the second storage unit 15 and send the parameters to the parameter preprocessing unit 29; and the data read-write unit 16 is further configured to write the image data subjected to the pooling operation, which is sent by the write back unit 27, into the first storage unit 14.

Specifically, the data read-write unit 16 in the embodiment of the present disclosure may classify the read and write commands of the first storage unit 14 and the second storage unit 15, the original image data received from the first interface 12 will be written into the first storage unit 14 via the data read-write unit 16, the image preprocessing unit 28 may read the first storage unit 14 via the data read-write unit 16, and the convolution operation parameters and the batch processing operation parameters received from the second interface will also be written into the second storage unit 15 via the data read-write unit 16, and the parameter preprocessing unit 29 may also read the second storage unit 15 via the data read-write unit 16. In addition, the write back unit 27 may also write the image data of each output channel after the operation into the first storage unit 14 via the data read-write unit 16. In the embodiments of the present disclosure, the first interface may be an active write-type interface, that is, the data transmission bus actively write the original image data and the convolutional neural network configuration parameters via the first interface; while the second interface may be a passive read-type interface, that is, it needs to read the convolution operation parameters, the batch processing operation parameters and the activation operation parameters via a second interface.

The first storage unit 14 may store the image data obtained by performing an operation on the original image data. For example, the depth of the storage used by the first storage unit 14 may be 32K, and the bit width may be 64 Byte, that is, data for 64 pixels may be stored in each line of the storage used by the first storage unit 14, and if the width of the original image data exceeds 64 pixels, one line of the original image data will be stored in a plurality of lines of the storage used by the first storage unit 14. As illustrated in the above embodiment, the data for 64 pixels stored in the first storage unit may simultaneously participate in the operation in the convolutional neural network operation module, that is, the convolutional neural network operation module includes 64 operation components, and the data for 64 pixels in the storage used by the first storage unit 14 respectively participate in the convolution operation, the batch processing operation and the activation operation of operation components. In order to support a convolution operation kernel with a size of 3×3, the bit width of the storage used by the first storage unit 14 may be expanded from 64 Byte to 66 Byte, which is respectively defined as B0, B1, B2, . . . , B65, where B1-B64 are still used for storing the 64 Byte of each line of the original image data, B0 is used for storing B64 of the previous line of the storage used by the first storage unit 14, and B65 is used for storing B1 of the next line of the storage used by the first storage unit 14. A storage diagram of the storage used by the first storage unit 14 is as shown in FIG. 6, where $D_{idx}$ represents data for a pixel, which has the same meanings as B0-B65. FIG. 7 is a schematic diagram of a convolution operation according to an embodiment of the present disclosure. As shown in FIG. 7, it is illustrated by an example in which the convolution kernel size is 3×3, that is, the size of the sliding window in the convolution operation is 3×3. In the convolution operation, each sliding window with a size of 3×3 is taken as a unit, and the pixel data of pixels in the sliding window are multiplied by the convolution operation parameters one by one, and the results are accumulated and summed, and then convolution operations of other steps are performed.

Figure 8:
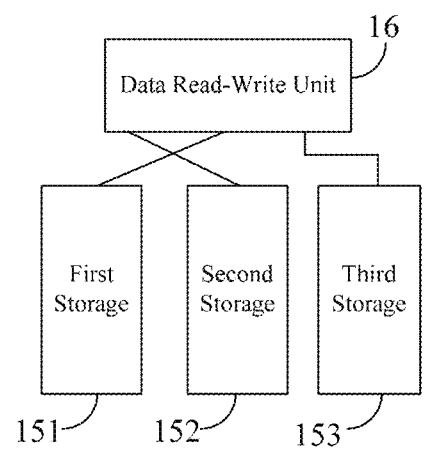
FIG. 8 is a structural representation of a second storage unit according to an embodiment of the present disclosure.

Optionally, FIG. 8 is a structural representation of a second storage unit according to an embodiment of the present disclosure. As shown in FIG. 8, the second storage unit 15 in the embodiment of the present disclosure may include a first storage 151, a second storage 152 and a third storage 153, and the data read-write unit 16 is specifically configured to write/read the convolution operation parameters into/from the first storage 151 or the second storage 152. The data read-write unit 16 reads the convolution operation parameters from the second storage 152 when writing the convolution operation parameters into the first storage 151, or reads the convolution operation parameters from the first storage 151 when writing the convolution operation parameters into the second storage 152, that is, the convolutional neural network operation parameters are alternately written into the first storage 151 and the second storage 152 in a ping-pong operation mode, and the convolutional neural network operation parameters are read alternately from the first storage 151 and the second storage 152, thus the parameter read-write efficiency may be improved, and the real-time performance of the whole image recognition processing may be improved. In addition, the above data read-write unit 16 is further configured to write the batch processing operation parameters into the third storage 153 and read the batch processing operation parameters from the third storage 153.

The process of the convolutional neural network operation will be illustrated in detail below in conjunction with each functional unit in the convolutional neural network operation module in the embodiment of the present disclosure. Reference may still be made to FIG. 5, and it specifically relates to the image preprocessing unit 28, the parameter preprocessing unit 29, the convolution operation unit 22, the batch processing operation unit 23, the activation operation unit 24, the pooling unit 26 and the write back unit 27.

Specifically, during the operation process, first of all, the image preprocessing unit 28 initiates a data read request to the data read-write unit 16, the data read request is sent to the first storage unit 14 by the data read-write unit 16, and the image preprocessing unit 28 performs image padding processing on the fed back original image data and then sends it to the convolution operation unit 22 so as to meet the image data requirements of the convolution kernel size in the convolution operation process, for example, the convolution kernel size is 3×3. The parameter preprocessing unit 29 initiates a parameter read request to the data read-write unit 16, the parameter read request is sent to the second storage unit 15 by the data read-write unit 16 to obtain the convolution operation parameters, and the parameter preprocessing unit 29 will perform cumulative summation processing on the convolution operation parameters and then send the accumulation and summation result and the convolution operation parameters read to the convolution operation unit 22 simultaneously; in addition, the parameter preprocessing unit 29 will also obtain the batch processing operation parameters and send the batch processing operation parameters to the convolution operation unit 22, and specifically, because the batch processing operation is directly performed on the convolution operation result, the batch processing operation unit 23 and the convolution operation unit 22 may be incorporated into one operation unit.

While receiving the preprocessed image data and the convolution operation parameters, the convolution operation unit 22 simultaneously obtains the multiplication coefficient, the shift coefficient and the additive coefficient used in the convolution operation process, which are sent by the operation control unit 24 or the parameter distribution module 3, and then the convolution operation may be performed; the specific operation process includes: the pixel data in the convolution sliding window are multiplied by the corresponding positions of the convolution operation parameters, and then the results are accumulated and summed. The specific implementation process is as follows: the pixel data in the convolution sliding window are multiplied by the corresponding positions of the convolution operation parameters one by one, and a cumulative sum sum0 is obtained for all the multiplication results, the size of the sliding window is the size of the convolution kernel, referring to FIG. 7.

In addition, a multiplication and shift operation is respectively performed on the sliding window pixel data cumulative sum and the convolution operation parameters cumulative sum to obtain cumulative sums sum1 and sum2, and finally, sum0, sum1, sum2 and additive coefficient offset are summed to obtain the convolution operation result. Where, referring to the above description, the multiplication coefficient, the shift coefficient and the additive coefficient, reference may be obtained from the operation control unit 24 or the parameter distribution module 3.

The batch processing operation unit 23 needs to normalize the convolution operation result, where the mean value is 0, and the variance is 1. The specific implementation process is as follows: the convolution operation result is multiplied by the batch processing multiplication coefficient, and the batch processing result is obtained after shifting and accumulation with the additive offset, where the multiplication coefficient, the shift coefficient and the additive coefficient are all obtained by reading the data transmission bus via the second interface and stored in the second storage unit 16. Because the batch processing operation is directly performed on the convolution operation result, the convolution operation unit 22 and the batch processing operation unit 23 may be incorporated into one functional unit.

The activation operation unit 24 may perform an activation operation, and the unit may realize piecewise nonlinear mapping of input data, that is, compare the input data with several (for example, 16) activation parameters to find an activation parameter closest to the input data, calculate the difference therebetween and then perform multiplication, shifting and addition operations on the difference sequentially, here the 16 comparison coefficients, the multiplication coefficient, the shift coefficient and the additive coefficient are all obtained by reading the data transmission bus via the second interface and then sent to the parameter distribution module 3, and directly distributed by the parameter distribution module 3, or finally sent to the activation operation unit by the operation control unit 24. In addition, in the embodiments of the present disclosure, the convolution operation unit 22, the batch processing unit 23 and the activation unit 24 may form an operation component, and totally N operation components may be provided, so that convolutional neural network operation can be performed on data for N pixels at the same time, thereby attaining the technical effect of parallel operation and improving the operation efficiency of the image recognition process.

The pooling unit 26 may perform a pooling operation. An image input is reduced, and only important information is kept. It may calculate the maximum value or mean value of an area with 2×2 or 4×4 pixels, and it will be determined by the configuration parameters what pooling type is needed by each layer of convolutional neural network. Specifically, the pooling type may include, but is no limited to, calculating the mean value, maximum value, upper left value and upper right value in an area with 2×2 pixels, and the mean value, maximum value and upper left value in an area with 4×4 pixels, etc.

The data temporary storage unit 20 is connected to each convolution operation unit 22, and the data temporary storage unit 20 may temporarily store a result of the convolution operation performed for each input channel, that is, after a convolution operation is performed on the current input channel, the convolution operation unit 22 may read the previous convolution operation result from the data temporary storage unit 20, accumulate it with the convolution operation result of the current input channel, and then send it to the data temporary storage unit 20 for temporary storage.

The write back unit 27 may write the image data of each output channel after the convolution operation, batch processing operation, activation operation and pooling processing back into the first storage unit 14. At this moment, a write request will be first sent to the data read-write unit 16 and then sent to the first storage unit 14. In addition, the write back unit 27 will also write the image data of each output channel onto the data transmission bus and then read the data transmission bus in a direct memory access mode.

In the technical solutions provided in the embodiments of the present disclosure, in addition to that N operation components are provided for parallel operation and a first storage and a second storage of a ping-pong operation mode are provided to realize the storage of the convolution operation parameters, the operation efficiency can be significantly improved, and the real-time performance of the image recognition processing method can be improved. In addition, in the architecture of the image recognition processing apparatus according to the embodiment of the present disclosure, the first interface and the second interface connected to the data transmission bus is separated from the internal convolutional neural network operation module, which is favorable for upgrading and optimizing the convolutional neural network operation module. In addition, in the architecture according to the embodiments of the present disclosure, when each module is designed, for example, when the first interface, the first storage unit and the operation control module is designed, the requirements of different original image sizes, layers of convolutional neural network operation and convolution kernel sizes may be fully considered, thus convolutional neural network architectures of different scales may be supported.

The flow charts and block diagrams in the drawings of the embodiments of the present disclosure show possible architectures, functions and operations of the system, method and computer program product according to various embodiments of the present disclosure. On this point, each block in the flow chart or the block diagram may represent a module, a program segment or a part of codes. The module, the program segment or the part of codes contains one or more executable instructions for implementing a specified logic function. It should also be noted that, in some alternative implementations, the functions labelled in the blocks may also be realized in a different order from that shown in the drawings. For example, two connected blocks may in fact be executed in parallel basically, and sometimes they may also be executed in a reverse order, which is determined by the function involved. It should also be noted that, each block in the block diagram and/or flow chart and a combination of the blocks in the block diagram and/or flow chart may be implemented by a specialized hardware-based system configured to execute a specified function or operation, or may be implemented by a combination of dedicated hardware and computer instructions. When implemented by a hardware-based system, the addition operation and multiplication operation, etc., may be implemented via hardware such as an adder and a multiplier, etc. In addition, some logic controllers may be further added to realize the basic logic control.

The units or modules involved in the embodiments of the present disclosure described may be implemented via software or via hardware, The units or modules described may also be provided in a processor, and the names of these units or modules will not restrict the units or modules in certain circumstances.

The apparatus embodiments described above are merely illustrative, where a unit illustrated as a separate component may or may not be physically separated, and a component shown as a unit may or may not be a physical unit, that is, it may be located in one place or may be distributed among a plurality of network units. A part or all of the modules may be selected according to practical requirements to attain the objects of the solutions in the embodiment, which may be understood and implemented by one skilled in the art without creative effort.

By the description of the above embodiments, one skilled in the art may clearly understand that each embodiment may be implemented with the aid of software plus necessary universal hardware platforms; of course, it may be implemented via hardware. Based on such an understanding, the essential part of the technical solutions in the embodiments of the present disclosure, or in other words, the part that contributes to the prior art, may be embodied in the form of a software product that is stored in a computer-readable storage medium, for example, Read-Only Memory (ROM), Random-Access Memory (RAM), magnetic disc or compact disc, etc., and includes several instructions that can make a computer device (which may be a personal computer, a server or a network device, etc.) implement all or a part of the steps of the method according to each embodiment of the present disclosure.

Finally, it should be noted that, the above embodiments are only provided for illustrating, rather than limiting, the technical solutions of the present disclosure; although detailed illustration of the present disclosure has been given referring to the above embodiments, it should be understood by one of ordinary skills in the art that modifications may be made to the technical solutions recorded in each of the above embodiment, or equivalent substitutions may be made on a part of the technical characteristics thereof, without departing from the spirit and scope of the technical solutions in each embodiment of the present disclosure.

What is claimed is:

1. An image recognition processing method, comprising:
obtaining original image data, convolutional neural network configuration parameters and convolutional neural network operation parameters, wherein the original image data comprises data for M pixels, M being a positive integer;
performing, by a convolutional neural network operation module, a convolutional neural network operation on the original image data according to the convolutional neural network configuration parameters and the convolutional neural network operation parameters, wherein the convolutional neural network operation module comprises N operation components provided in parallel, each of the N operation components comprising a convolution operation unit, a batch processing operation unit and an activation operation unit connected sequentially, and the N operation components performing a convolution operation, a batch processing operation and an activation operation on the data for N pixels in the original image data respectively and simultaneously, N being a positive integer less than or equal to M.

2. The image recognition processing method of claim 1, wherein the obtaining original image data, convolutional neural network configuration parameters and convolutional neural network operation parameters comprises:
obtaining the original image data, the convolutional neural network configuration parameters and the convolutional neural network operation parameters via a data transmission bus.

3. The image recognition processing method of claim 2, wherein the obtaining the original image data, the convolutional neural network configuration parameters and the convolutional neural network operation parameters via a data transmission bus comprises:
obtaining the original image data, the convolutional neural network configuration parameters and the convolutional neural network operation parameters via an advanced extensible interface (AXI) bus.

4. The image recognition processing method of claim 2, wherein
the obtaining of the original image data comprises obtaining the original image data via a first interface, and writing the original image data into a first storage unit;
the obtaining of the convolutional neural network configuration parameters comprises obtaining a parameter configuration instruction via the first interface and sending the parameter configuration instruction to a parameter distribution module, wherein the parameter configuration instruction comprises the convolutional neural network configuration parameters; and
the obtaining of the convolutional neural network operation parameters comprises obtaining convolution operation parameters, batch processing operation parameters and activation operation parameters via a second interface, and writing the convolution operation parameters and the batch processing operation parameters into a second storage unit and sending the activation operation parameters to the parameter distribution module.

5. The image recognition processing method of claim 4, further comprising:
obtaining, by an operation control module, control-purpose configuration parameters among the convolutional neural network configuration parameters from the parameter distribution module;
controlling, by the operation control module according to the control-purpose configuration parameters, the obtaining of the original image data from the first interface, the obtaining of the parameter configuration instruction from the first interface and the obtaining of the convolution operation parameters, the batch processing operation parameters and the activation operation parameters from the second interface; and
sending, by the operation control module, the control-purpose configuration parameters among the convolutional neural network configuration parameters to the convolutional neural network operation module.

6. The image recognition processing method of claim 5, wherein the convolutional neural network operation module further comprises an operation control unit, and the image recognition processing method further comprises:
receiving, by the operation control unit, the control-purpose configuration parameters among the convolutional neural network configuration parameters, wherein the control-purpose configuration parameters comprise an original image size for input or output, and the number of input or output channels of each layer of convolutional neural network; and
controlling, by the operation control unit according to the control-purpose configuration parameters, reading of the original image data from the first storage unit, reading of the convolution operation parameters and the batch processing operation parameters from the second storage unit, and sending of the original image data, the convolution operation parameters and the batch processing operation parameters to the convolution operation unit.

7. The image recognition processing method of claim 6, further comprising:
obtaining, from the parameter distribution module by the operation control module, the activation operation parameters, and operation-purpose configuration parameters among the convolutional neural network configuration parameters, wherein the operation-purpose configuration parameters comprises convolution operation configuration parameters, a convolution kernel size and a pooling mode; sending, by the operation control module, the activation operation parameters, and the operation-purpose configuration parameters among the convolutional neural network configuration parameters to the operation control unit of the convolutional neural network operation module; and sending, by the operation control unit, the activation operation parameters to the activation operation unit, sending the convolution operation configuration parameters and the convolution kernel size to the convolution operation unit, and sending the pooling mode to a pooling unit; or sending, by the parameter distribution module, the activation operation parameters directly to the activation operation unit, sending the convolution operation configuration parameters and the convolution kernel size to the convolution operation unit, and sending the pooling mode to a pooling unit.

8. The image recognition processing method of claim 6, further comprising:
performing image padding processing on the original image data read from the first storage and sending the processed original image data to the convolution operation unit; and performing cumulative summation processing on the convolution operation parameters read from the second storage unit and sending the processed convolution operation parameters to the convolution operation unit.

9. The image recognition processing method of claim 6, wherein the second storage unit comprises a first storage, a second storage and a third storage, and the writing of the convolution operation parameters and the batch processing operation parameters into the second storage unit and the reading of the convolution operation parameters and the batch processing operation parameters from the second storage unit comprises:
writing the convolution operation parameters into the first storage or the second storage and reading the convolution operation parameters from the first storage or the second storage, wherein the convolution operation parameters are read from the second storage when the convolution operation parameters are written into the first storage, or the convolution operation parameters are read from the first storage when the convolution operation parameters are written into the second storage; and
writing the batch processing operation parameters into the third storage, and reading the batch processing operation parameters from the third storage.

10. An image recognition processing apparatus, comprising:
a parameter obtaining module configured to obtain original image data, convolutional neural network configuration parameters and convolutional neural network operation parameters, wherein the original image data comprises data for M pixels, M being a positive integer;
a convolutional neural network operation module connected to the parameter obtaining module and configured to perform convolutional neural network operation on the original image data according to the convolutional neural network configuration parameters and the convolutional neural network operation parameters, wherein the convolutional neural network operation module comprises N operation components provided in parallel, each of the N operation components comprising a convolution operation unit, a batch processing operation unit and an activation operation unit connected sequentially, and the N operation components performing a convolution operation, a batch processing operation and an activation operation on the data for N pixels in the original image data respectively and simultaneously, N being a positive integer less than or equal to M.

11. The image recognition processing apparatus of claim 10, further comprising a parameter distribution module, wherein the parameter obtaining module comprises a data transmission bus, a first interface, a second interface, a first storage unit and a second storage unit, wherein:
the data transmission bus is configured to transmit the original image data, the convolutional neural network configuration parameters and the convolutional neural network operation parameters;
the first interface comprises a first end connected to the data transmission bus, and a second end connected to the parameter distribution module and the first storage unit, and is configured to obtain the original image data from the data transmission bus and write the original image data into the first storage unit, and obtain a parameter configuration instruction from the data transmission bus and send the parameter configuration instruction to the parameter distribution module, wherein the parameter configuration instruction comprises the convolutional neural network configuration parameters; and
the second interface comprises a first end connected to the data transmission bus, and a second end connected to the parameter distribution module and the second storage unit, and is configured to obtain the convolution operation parameters, the batch processing operation parameters and the activation operation parameters from the data transmission bus, writ the convolution operation parameters and the batch processing operation parameters into the second storage unit, and send the activation operation parameters to the parameter distribution module.

12. The image recognition processing apparatus of claim 11, further comprising an operation control module connected to the parameter distribution module and the convolutional neural network operation module,
wherein the operation control module is configured to: obtain control-purpose configuration parameters among the convolutional neural network configuration parameters from the parameter distribution module; control according to the control-purpose configuration parameters the obtaining of the original image data from the first interface, the obtaining of the parameter configuration instruction from the first interface and the obtaining of the convolution operation parameters, the batch processing operation parameters and the activation operation parameters from the second interface; and send the control-purpose configuration parameters among the convolutional neural network configuration parameters to the convolutional neural network operation module.

13. The image recognition processing apparatus of claim 12, wherein the convolutional neural network operation module further comprises an operation control unit comprising a parameter input terminal connected to the operation control module, and a control terminal connected to the convolution operation unit, the batch processing operation unit and the activation operation unit;
  wherein the operation control unit is configured to: receive control-purpose configuration parameters among the convolutional neural network configuration parameters, the control-purpose configuration parameters comprising an original image size for input or output, and the number of input or output channels of each layer of convolutional neural network; and control, according to the control-purpose configuration parameters, reading of the original image data from the first storage unit, reading of the convolution operation parameters and the batch processing operation parameters from the second storage unit and sending of the original image data, the convolution operation parameters and the batch processing operation parameters to the convolution operation unit.

14. The image recognition processing apparatus of claim 13, wherein the convolutional neural network operation module further comprises a pooling unit and a write back unit, wherein:
  each of the pooling unit and the write back unit is connected to the control terminal of the operation control unit; the operation control module is further configured to obtain from the parameter distribution module the activation operation parameters, and operation-purpose configuration parameters among the convolutional neural network configuration parameters, the operation-purpose configuration parameters comprising convolution operation configuration parameters, a convolution kernel size and a pooling mode, and send the activation operation parameters and the operation-purpose configuration parameters to the operation control unit of the convolutional neural network operation module; and the operation control unit is further configured to send the activation operation parameters to the activation operation unit, send the convolution operation configuration parameters and the convolution kernel size to the convolution operation unit, and send the pooling mode to the pooling unit; or
  the parameter distribution module is directly connected to the activation operation unit, the convolution operation unit and the pooling unit, and is configured to directly send the activation operation parameters to the activation operation unit, send the convolution operation configuration parameters and the convolution kernel size to the convolution operation unit, and send the pooling mode to the pooling unit.

15. The image recognition processing apparatus of claim 13, wherein the convolutional neural network operation module further comprises:
  an image preprocessing unit provided between the first storage unit and the convolution operation unit and configured to perform image padding processing on the original image data and send the processed original image data to the convolution operation unit; and
  a parameter preprocessing unit provided between the second storage unit and the convolution operation unit and configured to perform cumulative summation processing on the convolution operation parameters and send the processed convolution operation parameters to the convolution operation unit.

16. The image recognition processing apparatus of claim 15, wherein the parameter obtaining module further comprises a data read-write unit connected to the first interface, the first storage unit, the second interface, the second storage unit, the image preprocessing unit, the parameter preprocessing unit, and the write back unit, wherein
  the data read-write unit is configured to obtain the original image data from the first interface and write the original image data into the first storage unit, and read the original image data from the first storage unit and send the original image data to the image preprocessing unit;
  the data read-write unit is further configured to obtain the convolution operation parameters and the batch processing operation parameters from the second interface and write the convolution operation parameters and the batch processing operation parameters into the second storage unit, and read the convolution operation parameters and the batch processing operation parameters from the second storage unit and send the convolution operation parameters and the batch processing operation parameters to the parameter preprocessing unit; and
  the data read-write unit is further configured to write into the first storage unit the image data subjected to a pooling operation and sent by the write back unit.

17. The image recognition processing apparatus of claim 16, wherein the second storage unit comprises a first storage, a second storage and a third storage, and the data read-write unit is configured to:
  write the convolution operation parameters into the first storage or the second storage, and read the convolution operation parameters from the first storage or the second storage, wherein the convolution operation parameters are read from the second storage when writing the convolution operation parameters into the first storage, or the convolution operation parameters are read from the first storage when writing the convolution operation parameters into the second storage; and
  write the batch processing operation parameters into the third storage, and read the batch processing operation parameters from the third storage.

18. The image recognition processing apparatus of claim 10, further comprising a data temporary storage unit connected to the convolution operation unit of each of the N operation components and configured to store a result of convolution operation performed for each input channel by the convolution operation unit.

19. The image recognition processing apparatus of claim 10, wherein the data transmission bus is an advanced extensible interface (AXI) bus.

* * * * *